(12) United States Patent
Neaville et al.

(10) Patent No.: US 12,379,285 B1
(45) Date of Patent: Aug. 5, 2025

(54) OPTIMIZED HIGH-SPEED CYLINDER PRESSURE DATA RETRIEVAL AND REPORTING

(71) Applicant: Caterpillar Inc., Peoria, IL (US)

(72) Inventors: Andrew Jordon Neaville, Mt. Pulaski, IL (US); Michael Todd Graziano, Washington, IL (US); Jeffrey Michael Thate, Washington, IL (US); Erik Alexander Lau, Peoria, IL (US); John D. Parker, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/658,452

(22) Filed: May 8, 2024

(51) Int. Cl.
*F02D 41/22* (2006.01)
*G01M 15/08* (2006.01)
(Continued)

(52) U.S. Cl.
CPC ............. *G01M 15/08* (2013.01); *F02D 41/22* (2013.01); *G01M 15/11* (2013.01); *F02D 2200/024* (2013.01); *H04L 12/4013* (2013.01)

(58) Field of Classification Search
CPC .. F02D 41/22; F02D 41/0085; F02D 41/0087; F02D 41/0057; F02D 41/005; F02D 41/1454; F02D 21/08; F02D 37/02; G01M 15/08; G06F 13/36; G06F 13/42; G06F 3/0679; G06F 3/0623; G06F 3/0619; G06F 3/0655; G06F 3/0656; G06F 3/061; G06F 3/0683; G06F 11/0727; G06F 11/1428; G06F 11/1469; G06F 11/2094; H04L 12/40006; H04L 2012/40215; H04L 2012/40208; H04L 2012/40273; F02P 9/002; F02P 5/1512; F02P 5/1516;
(Continued)

(56) References Cited

U.S. PATENT DOCUMENTS 7,231,905 B1 * 6/2007 Haskara .............. F02D 41/0052
                                                                                        123/568.11
9,569,312 B2    2/2017   Taveniku
(Continued)

FOREIGN PATENT DOCUMENTS

| CN | 108510616 A | 9/2018 |
|---|---|---|
| CN | 115097837 A | 9/2022 |

(Continued)

*Primary Examiner* — Hai H Huynh
*Assistant Examiner* — Johnny H Hoang

(57) ABSTRACT

A machine includes an engine that includes a plurality of cylinders, one or more controllers, and a monitoring and reporting module. The monitoring and reporting module receives, from the one or more controllers, and via a first data link of the machine, cylinder pressure data associated with the plurality of cylinders and stores the cylinder pressure data in a data structure. The monitoring and reporting module receives, from the one or more controllers, and via a second data link of the machine, operational information associated with the engine and determines, based on the operational information, that one or more trigger criteria are satisfied. The monitoring and reporting module generates, based on determining that the one or more trigger criteria are satisfied, a data file that includes a portion of the cylinder pressure data and transmits the data file to a device not included in the machine.

20 Claims, 5 Drawing Sheets

(51) Int. Cl.
*G01M 15/11* (2006.01)
*H04L 12/40* (2006.01)

(58) Field of Classification Search
CPC . F02P 5/15; F02P 5/045; F02M 26/05; F02M 26/43; F02M 26/46; F02M 26/47
USPC ...... 701/101–106, 110, 114, 115; 123/339.1, 123/339.2, 435, 406.13, 406.14, 406.17, 123/406.22, 406.41, 406.42, 406.43; 73/35.01, 35.03–35.7, 35.12, 114.02, 73/114.08, 114.16–114.18
See application file for complete search history.

(56) References Cited

U.S. PATENT DOCUMENTS

| | | | |
|---|---|---|---|
| 10,380,057 B2 | 8/2019 | Nara et al. | |
| 2017/0153717 A1* | 6/2017 | Moore | G06F 3/0619 |
| 2017/0176280 A1* | 6/2017 | Joshi | G01M 15/08 |
| 2017/0218863 A1* | 8/2017 | Geckler | F02P 9/002 |
| 2021/0148325 A1* | 5/2021 | Svensson | F02P 5/145 |
| 2022/0335753 A1 | 10/2022 | Yang et al. | |
| 2022/0392272 A1 | 12/2022 | Huang et al. | |

FOREIGN PATENT DOCUMENTS

| | | |
|---|---|---|
| CN | 217932485 U | 11/2022 |
| JP | 08166328 A | 6/1996 |
| JP | 2001221096 A | 8/2001 |
| JP | 4167487 B2 | 10/2008 |
| KR | 102159136 B1 | 9/2020 |

\* cited by examiner

500

510 — Receive, via a first data link of the machine, cylinder pressure data associated with the plurality of cylinders 520 — Store the cylinder pressure data in a data structure 530 — Receive, via a second data link of the machine, operational information associated with the engine 540 — Determine that one or more trigger criteria are satisfied 550 — Generate a data file that includes a portion of the cylinder pressure data 560 — Transmit the data file to a device not included in the machine

OPTIMIZED HIGH-SPEED CYLINDER PRESSURE DATA RETRIEVAL AND REPORTING

TECHNICAL FIELD

The present disclosure relates generally to cylinder pressure data retrieval and reporting and, for example, to optimized cylinder pressure data retrieval and reporting.

BACKGROUND

A machine can include a controller (e.g., an electronic control module (ECM)) to monitor cylinder health of an engine of the machine. Often, the controller obtains or determines cylinder-related measurements related to performance and characteristics of cylinders of the engine. For example, the controller can obtain or determine a peak cylinder pressure associated with each cylinder of the engine, a knock value (also referred to as a detonation value) associated with each cylinder of the engine, or an indicated mean effective pressure associated with each cylinder of the engine. These cylinder-related measurements then can be analyzed by the controller (or a separate computing device) to identify a performance issue with one or more cylinders of the engine.

However, the cylinder-related measurements are often derived from values provided by sensors configured to measure other characteristics. That is, the cylinder-related measurements are indirect measurements (also referred to as pseudo measurements), which can impact a precision and accuracy associated with identifying performance issues associated with the cylinders of the engine. Further, the sensors are often low-speed sensors (e.g., that obtain measurements once per second, or a few times per second) and therefore the cylinder-related measurements are also low-speed measurements. Therefore, there is often not enough information to precisely and accurately identify performance issues with one or more cylinders of the engine.

Japan Patent No. 4167487 (the '487 patent) discloses a knock detection device for an internal combustion engine. As described in the '487 patent, a high-speed data logger samples in-cylinder pressure sensor output amplified by an amplifying circuit at a high frequency, and records in-cylinder pressure data for each unit period for each cylinder and each cycle. An in-cylinder pressure analysis personal computer incorporates a program for "knock determination processing" based on the in-cylinder pressure data and a crank angle signal of each cylinder to enable a knock determination to be performed.

While the '487 patent discloses a way to use in-cylinder pressure data to enable a knock determination, the '487 patent requires that a high-speed data logger be available to store in-cylinder pressure sensor output throughout the knock determination process and for an in-cylinder pressure analysis personal computer to be available to read and process the in-cylinder pressure sensor output. Including such devices in a machine for any situation other than a testing scenario is impractical. Further, the '487 patent requires that the engine is operated under a predetermined operation condition and a predetermined ignition timing. Consequently, the knock detection device of the '487 patent is unlikely to detect knock issues that result from real-world operation of the engine.

The monitoring and reporting module of the present disclosure of the present disclosure solves one or more of the problems set forth above and/or other problems in the art.

SUMMARY

A machine may include an engine that includes a plurality of cylinders; one or more controllers; and a monitoring and reporting module configured to: receive, from the one or more controllers, and via a first data link of the machine, cylinder pressure data associated with the plurality of cylinders; store the cylinder pressure data in a data structure; receive, from the one or more controllers, and via a second data link of the machine, operational information associated with the engine; determine, based on the operational information, that one or more trigger criteria are satisfied; generate, based on determining that the one or more trigger criteria are satisfied, a data file that includes a portion of the cylinder pressure data stored in the data structure; and transmit the data file to a device not included in the machine.

A monitoring and reporting module of a machine may include one or more memories; and one or more processors, coupled to the one or more memories, configured to: receive, via a first data link of the machine, cylinder pressure data associated with an engine of the machine; store the cylinder pressure data in a data structure; receive, via a second data link of the machine, operational information associated with the engine of the machine; determine, based on the operational information, that one or more trigger criteria are satisfied; generate, based on determining that the one or more trigger criteria are satisfied, a data file that includes a portion of the cylinder pressure data stored in the data structure; and transmit the data file.

A method may include receiving, by a monitoring and reporting module of a machine, via a first data link of the machine, cylinder pressure data associated with an engine of the machine; receiving, by the monitoring and reporting module, via a second data link of the machine, operational information associated with the engine of the machine; determining, by the monitoring and reporting module and based on the operational information, that one or more trigger criteria are satisfied; generating, by the monitoring and reporting module and based on determining that the one or more trigger criteria are satisfied, a data file that includes a portion of the cylinder pressure data; and transmitting, by the monitoring and reporting module, the data file.

BRIEF DESCRIPTION OF THE DRAWINGS

FIG. 5 is a flowchart of an example process associated with optimized high-speed cylinder pressure data retrieval and reporting.

DETAILED DESCRIPTION

This disclosure relates to a monitoring and reporting module providing optimized cylinder pressure data retrieval and reporting associated with cylinders of an engine. The monitoring and reporting module, as described herein, has universal applicability to any machine utilizing such a monitoring and reporting module. The term "machine" may refer to a vehicle, any machine that performs an operation associated with an industry such as, for example, mining, construction, farming, transportation, or any other industry, and any other machine that includes an engine. As some examples, the machine may be an automobile (e.g., a passenger car, a truck, or other vehicle), an off-highway truck, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, a pump, a power generation set (e.g., a "genset"), a hydraulic fracturing rig, a gas compressor, stationary equipment, non-stationary equipment, or other above ground equipment, underground equipment, aerial equipment, or marine equipment.

Figure 1:
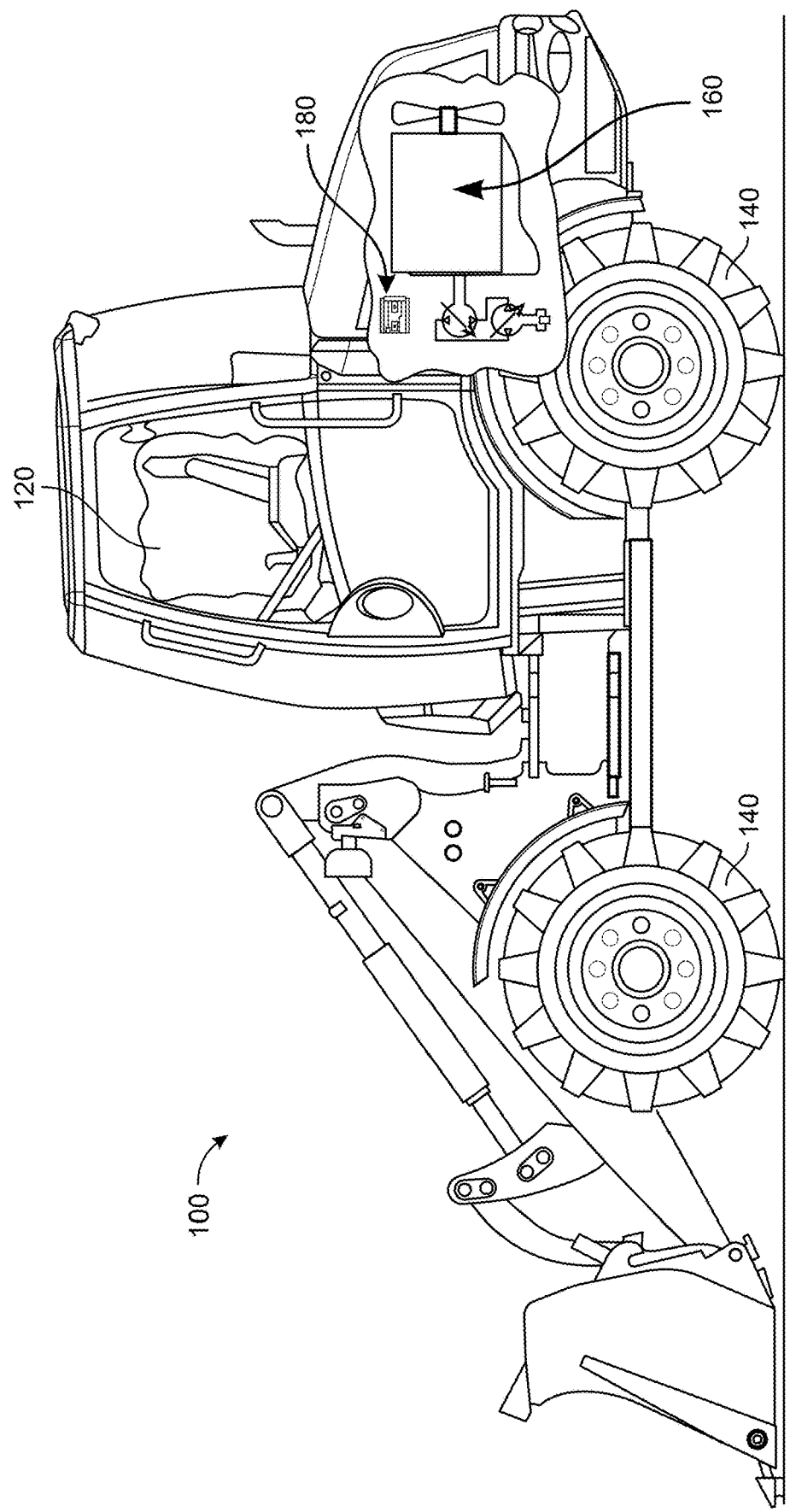
FIG. 1 is a diagram of an example machine described herein.

FIG. 1 is a diagram of an example machine 100 described herein. For example, machine 100 may include a mobile machine, such as the wheel loader shown in FIG. 1, or any other type of mobile machine. The machine 100 may include an operator station 120, one or more traction devices 140 (sometimes referred to as ground engagements), an engine 160 operatively connected to provide power to drive at least one of traction devices 140, and a monitoring and reporting module 180 connected to one or more components of machine 100. The monitoring and reporting module 180 may perform operations related to optimized cylinder pressure data retrieval and reporting, as described in more detail elsewhere herein.

As indicated above, FIG. 1 is provided as an example. Other examples may differ from what is described in connection with FIG. 1.

Figure 2:
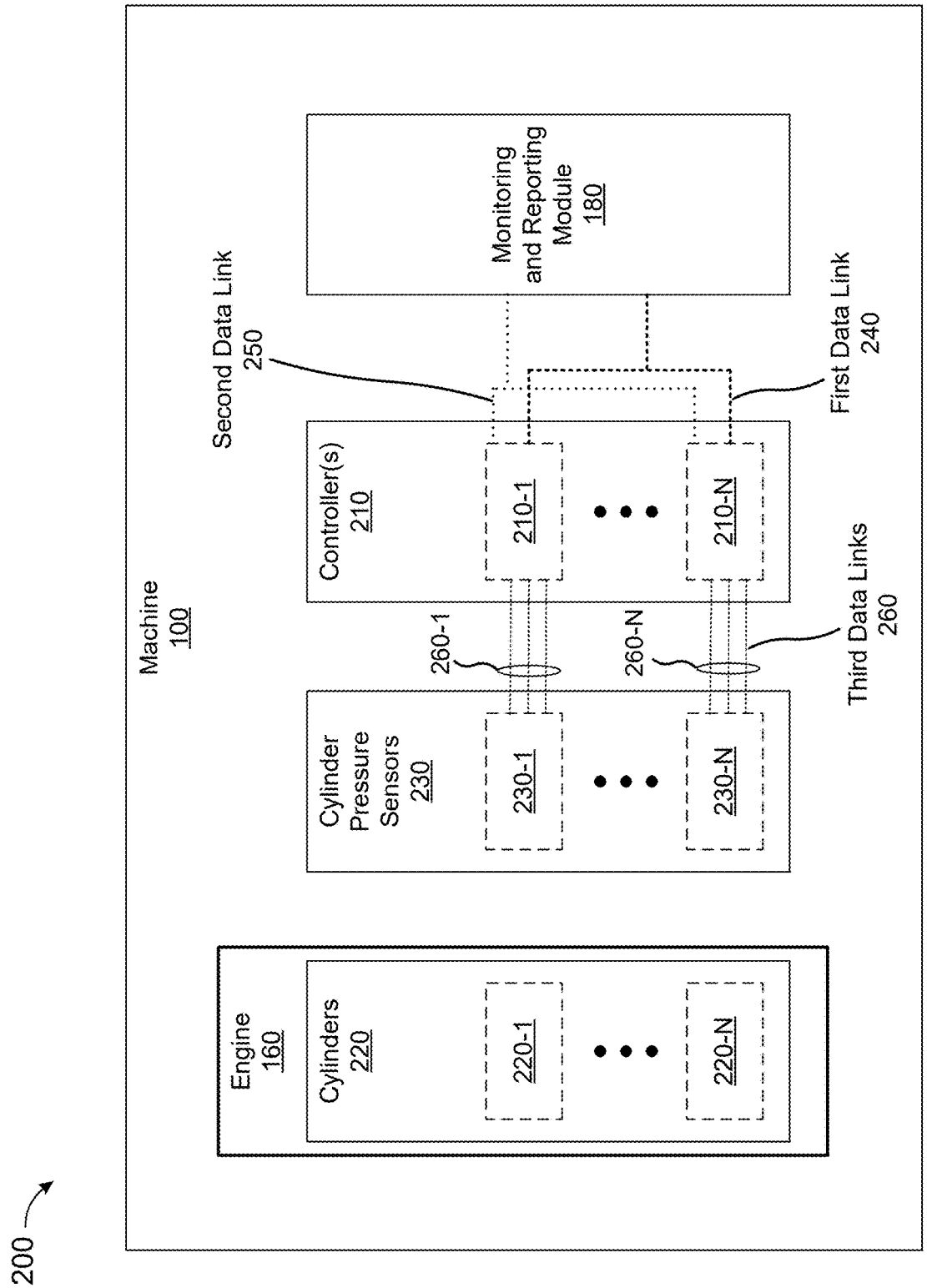
FIG. 2 is a schematic diagram of components of the example machine.

FIG. 2 is a schematic diagram 200 of components of the example machine 100. As shown in FIG. 2, the machine 100 includes the engine 160, the monitoring and reporting module 180, and one or more controllers 210 (e.g., that are configured as ECMs of the machine 100). The engine 160 includes a plurality of cylinders 220 (e.g., six or more cylinders). As further shown in FIG. 2, the machine 100 may also include a plurality of cylinder pressure sensors 230.

The engine 160 may be a compression ignition, internal combustion engine, or may include any other type of internal combustion engine that includes the plurality of cylinders 220. The engine 160 may be fueled by such fuels as gasoline, distillate diesel fuel, biodiesel, dimethyl ether, gaseous fuels (such as hydrogen, natural gas, and propane), alcohol, ethanol, and/or any combination thereof.

As shown in FIG. 2, the plurality of cylinders 220 may be divided into multiple groups of cylinders 220 (e.g., multiple banks of cylinders 220), where each group of cylinders 220 (shown as groups of cylinders 220-1 through 220-N) may be associated with a corresponding controller 210 of the one or more controllers 210 (shown as controllers 210-1 through 210-N). Each controller 210 may be configured to control and/or to monitor a corresponding group of cylinders 220. For example, the controller 210-1 may be configured to control and/or to monitor the group of cylinders 220-1, and the controller 210-N may be configured to control and/or monitor the group of cylinders 220-N.

As further shown in FIG. 2, the plurality of cylinder pressure sensors 230 respectively correspond to the plurality of cylinders 220. That is, each cylinder pressure sensor 230 may be configured as an in-cylinder pressure sensor and may be configured to measure cylinder pressure of a corresponding cylinder 220 (e.g., at different phases of a cycle of the engine 160). The plurality of cylinder pressure sensors 230 may be configured to provide cylinder pressure data to the one or more controllers 210. The cylinder pressure data may indicate, for example, respective pressures inside the plurality of cylinder pressure sensors 230 (e.g., during different phases of one or more cycles of the engine 160). The plurality of cylinder pressure sensors 230 may be "high speed" cylinder pressure sensors that, for example, are configured to measure cylinder pressure at 1000, 1500, 2000, or more, Hertz (Hz). Accordingly, the cylinder pressure data may be "high speed" cylinder pressure data that indicates respective pressures inside the plurality of cylinder pressure sensors 230 at 1000, 1500, 2000, or more instants of time per second.

As further shown in FIG. 2, the machine 100 may also include different data links, such as a first data link 240, a second data link 250, and a plurality of third data links 260. The first data link 240 may connect the one or more controllers 210 and the monitoring and reporting module 180. The first data link 240 may be, for example, an Ethernet data link. Accordingly, the first data link 240 may be associated with a first data speed (e.g., 10 megabits per second (Mbps), 100 Mbps, 1 gigabit per second (Gbps), 10 Gbps, or more, when the first data link 240 is an Ethernet data link). Additionally, or alternatively, the second data link 250 may connect the one or more controllers 210 and the monitoring and reporting module 180. The second data link 250 may be, for example, a controller area network (CAN) data link and/or a universal measurement and calibration protocol (XCP) data link. Accordingly, the second data link 250 may be associated with a second data speed (e.g., capped at 3 Mbps, 2 Mbps, 1 Mbps, or less, when the second data link 250 is a CAN data link and/or an XCP data link). In this way, in some implementations, the first data speed may be greater than the second data speed. Accordingly, the first data link 240 may be a "high speed" data link and the second data link 250 may be a "low speed" data link.

The plurality of third data links 260 may connect the plurality of cylinder pressure sensors 230 to the one or more controllers 210. For example, a group of cylinder pressure sensors 230, of the plurality of cylinder pressure sensors 230, which are associated with a group of cylinders 220, may be connected to a particular controller 210, of the one or more controllers 210, via respective third data links 260. In a specific example, as shown in FIG. 2, a group of cylinder pressure sensors 230-1 that are associated with the group of cylinders 220-1 are connected to the controller 210-1 via respective third data links 260-1, and a group of cylinder pressure sensors 230-N that are associated with the group of cylinders 220-N are connected to the controller 210-N via respective third data links 260-N. Each third data link 260 may be, for example, a jumper harness connection or another type of specific data connection configured to allow a cylinder pressure sensor 230 to communicate with a controller 210. The plurality of third data links 260 may be associated with a third data speed (e.g., 10 Mbps, 100 Mbps, 1 Gbps, 10 Gbps, or more) to allow the plurality of cylinder pressure sensors 230 to provide the cylinder pressure data to the one or more controllers 210. Accordingly, the third data speed may be greater than the second data speed, and each third data link 260 may be a "high speed" data link.

As indicated above, FIG. 2 is provided as an example. Other examples may differ from what is described in connection with FIG. 2.

Figure 3:
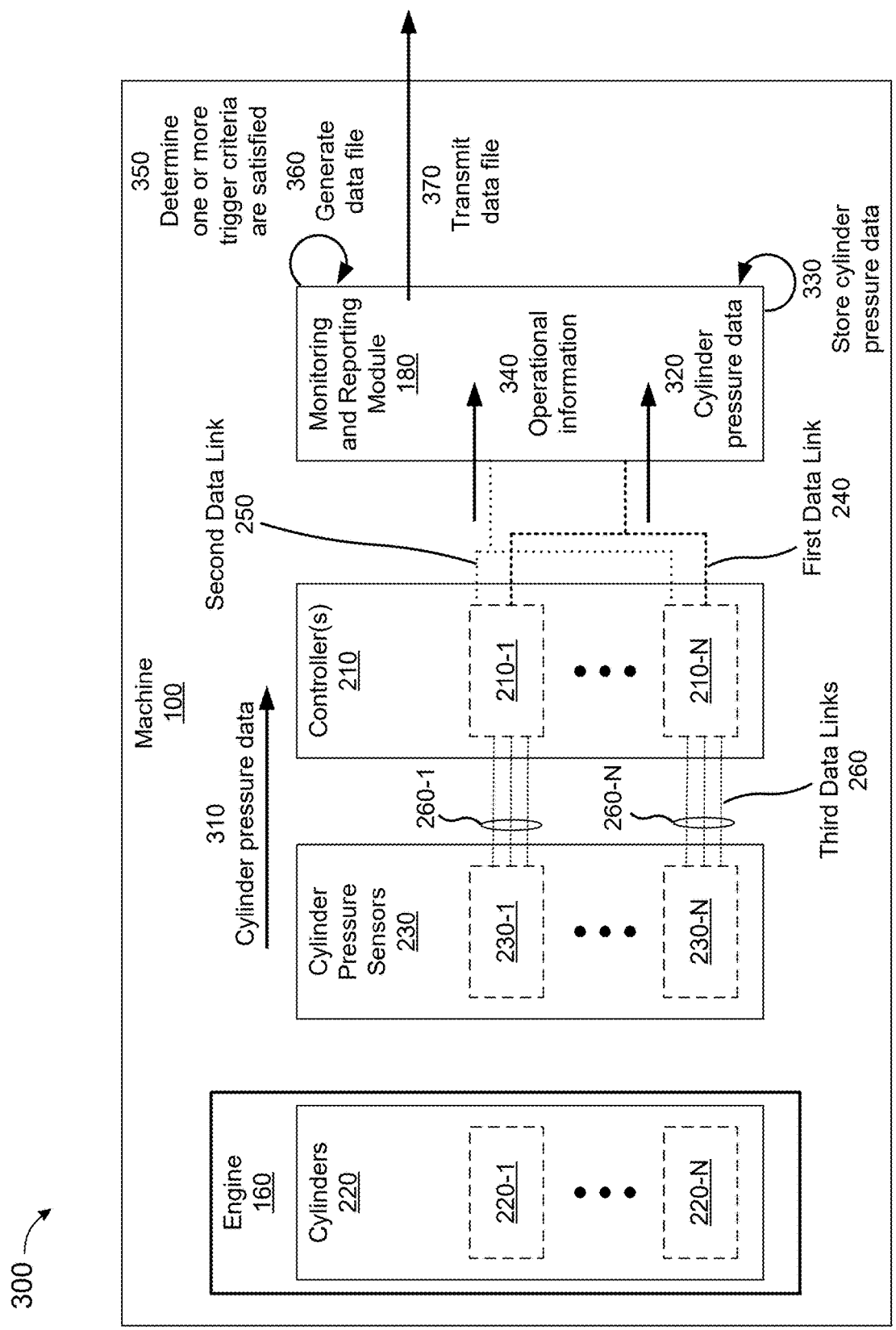
FIG. 3 shows an example implementation described herein.

FIG. 3 shows an example implementation 300 described herein.

As shown in FIG. 3, and by reference number 310, the plurality of cylinder pressure sensors 230 may provide cylinder pressure data to the one or more controllers 210 of the machine 100. For example, the plurality of cylinder pressure sensors 230 may provide the cylinder pressure data to the one or more controllers 210 via the plurality of third data links 260. In some implementations, the cylinder pressure data may include a first portion of cylinder pressure data (e.g., that is associated with a first group of cylinders 220, such as the group of cylinders 220-1) and a second portion of cylinder pressure data (e.g., that is associated with a second group of cylinders 220, such as the group of cylinders 220-N). Accordingly, the first portion of cylinder pressure data may be provided to a first controller 210 (e.g., the controller 210-1) by a first group of cylinder pressure sensors 230 (e.g., the group of cylinder pressure sensors 230-1) via a first set of the third data links 260 (e.g., the third data links 260-1) and the second portion of cylinder pressure data may be provided to a second controller 210 (e.g., the controller 210-N) by a second group of cylinder pressure sensors 230 (e.g., the group of cylinder pressure sensors 230-N) via a second set of the third data links 260 (e.g., the third data links 260-N).

As shown by reference number 320, the monitoring and reporting module 180 may be configured to receive the cylinder pressure data. For example, the monitoring and reporting module 180 may be configured to receive the cylinder pressure data from the one or more controllers 210 via the first data link 240. In some implementations, when the cylinder pressure data includes the first portion of cylinder pressure data and the second portion of cylinder pressure data, the monitoring and reporting module 180 may receive the first portion of cylinder pressure data from the first controller 210 (e.g., the controller 210-1) via the first data link 240, and the monitoring and reporting module 180 may receive the second portion of cylinder pressure data from the second controller 210 (e.g., the controller 210-N) via the first data link 240.

As shown by reference number 330, the monitoring and reporting module 180 may be configured to store the cylinder pressure data in a data structure. The data structure may include, for example, a temporary buffer (e.g., a circular buffer), or another type of data structure that has a set size (e.g., measured in bytes, megabytes, or gigabytes, among other examples) and/or that is configured to store a particular amount of recently received data (e.g., measured in milliseconds, hundredths of a second, or seconds, among other examples). The data structure may be included in the monitoring and reporting module 180.

As shown by reference number 340, the monitoring and reporting module 180 may be configured to receive operational information associated with the engine 160. For example, the monitoring and reporting module 180 may be configured to receive the cylinder pressure data from the one or more controllers 210 via the second data link 250. The operation information may include, for example, peak pressure information associated with the plurality of cylinders 220 (e.g., that indicates a peak pressure associated with each cylinder 220), detonation level information associated with the plurality of cylinders 220 (e.g., that indicates a detonation level associated with each cylinder 220), a cylinder misfire indicator (e.g., a flag, or another type of indicator) associated with each cylinder 220 that has experienced a cylinder misfire, a cylinder preignition indicator (e.g., a flag, or another type of indicator) associated with each cylinder 220 that experienced a cylinder preignition event, a sensor error indicator (e.g., a flag, or another type of indicator) associated with each cylinder pressure sensor 230 that has experienced an error or other issue (e.g., associated with reading a cylinder pressure of a corresponding cylinder 220). The one or more controllers 210 may receive and/or determine the operation information as a result of controlling and/or monitoring the plurality of cylinders 220.

As shown by reference number 350, the monitoring and reporting module 180 may be configured to determine that one or more trigger criteria are satisfied (e.g., based on the operational information). For example, to determine that the one or more trigger criteria are satisfied, the monitoring and reporting module 180 may be configured to: determine, based on the operational information, that a peak pressure associated with a cylinder 220, of the plurality of cylinders 220, is greater than a peak pressure threshold (e.g., a peak pressure associated with a nonoptimal cylinder performance); determine, based on the operational information, that a detonation level associated with a cylinder 220, of the plurality of cylinders 220, is greater than a detonation level threshold (e.g., a detonation level associated with a nonoptimal cylinder performance); determine that the operation information includes a cylinder misfire indicator associated with a cylinder 220 of the plurality of cylinders 220; determine that the operation information includes a cylinder preignition indicator associated with a cylinder 220 of the plurality of cylinders 220; and/or determine that the operation information includes a sensor error indicator associated with a cylinder 220 of the plurality of cylinders 220. When the monitoring and reporting module 180 determines that the one or more trigger criteria are satisfied, the monitoring and reporting module 180 may be configured to perform one or more operations described herein in relation to reference numbers 360 and 370.

As shown by reference number 360, the monitoring and reporting module 180 may be configured to generate a data file (e.g., based on determining that the one or more trigger criteria are satisfied). The data file may include a portion of the cylinder pressure data (e.g., a portion of the cylinder pressure data stored in the data structure). For example, the data file may include a portion of the cylinder pressure data associated with a most recent time period (e.g., a previous tenth of a second, a previous half of a second, or a previous second, among other examples).

In some implementations, the monitoring and reporting module 180 may be configured to identify an instant in time associated with determining that the one or more trigger criteria are satisfied (e.g., as described herein in relation to reference number 350). For example, the monitoring and reporting module 180 may be configured to identify that the determination is made at, or nearly at, the instant in time. Accordingly, the monitoring and reporting module 180 may be configured to identify a first set of cylinder pressure data (e.g., of the cylinder pressure data stored in the data structure), associated with a first time period that began prior to, and including, the instant in time, and to identify a second set of cylinder pressure data (e.g., of the cylinder pressure data stored in the data structure) associated with a second time period that ceased after the instant in time. The monitoring and reporting module 180 may be configured to generate the data file to include the first set of cylinder pressure data and the second set of cylinder pressure data. Put another way, when the instant in time is X, the monitoring and reporting module may configured to generate the data file to include a first set of pressure data associated with a first time period that begins at a time greater than or equal to X−Y (where Y is a particular amount of time) and ends at time less than or equal to X, and to include a second set of pressure data associated with a second time period that begins at a time greater than X and ends at time less than or equal to X+Z (where Z is another particular amount of time).

As shown by reference number 370, the monitoring and reporting module 180 may be configured to transmit the data file. For example, the monitoring and reporting module 180 may transmit the data file to a device not included in the machine 100. That is, the monitoring and reporting module 180 may transmit the data file outside of the machine 100. For example, the monitoring and reporting module 180 may be configured to send the data file, via a wireless connection (e.g., a cellular connection, a WiFi connection, a Bluetooth connection, among other examples), to another device, such as a server device. This may allow the other device to process and analyze the data file to determine a condition and/or health of the plurality of cylinders 220.

As indicated above, FIG. 3 is provided as an example. Other examples may differ from what is described in connection with FIG. 3.

Figure 4:
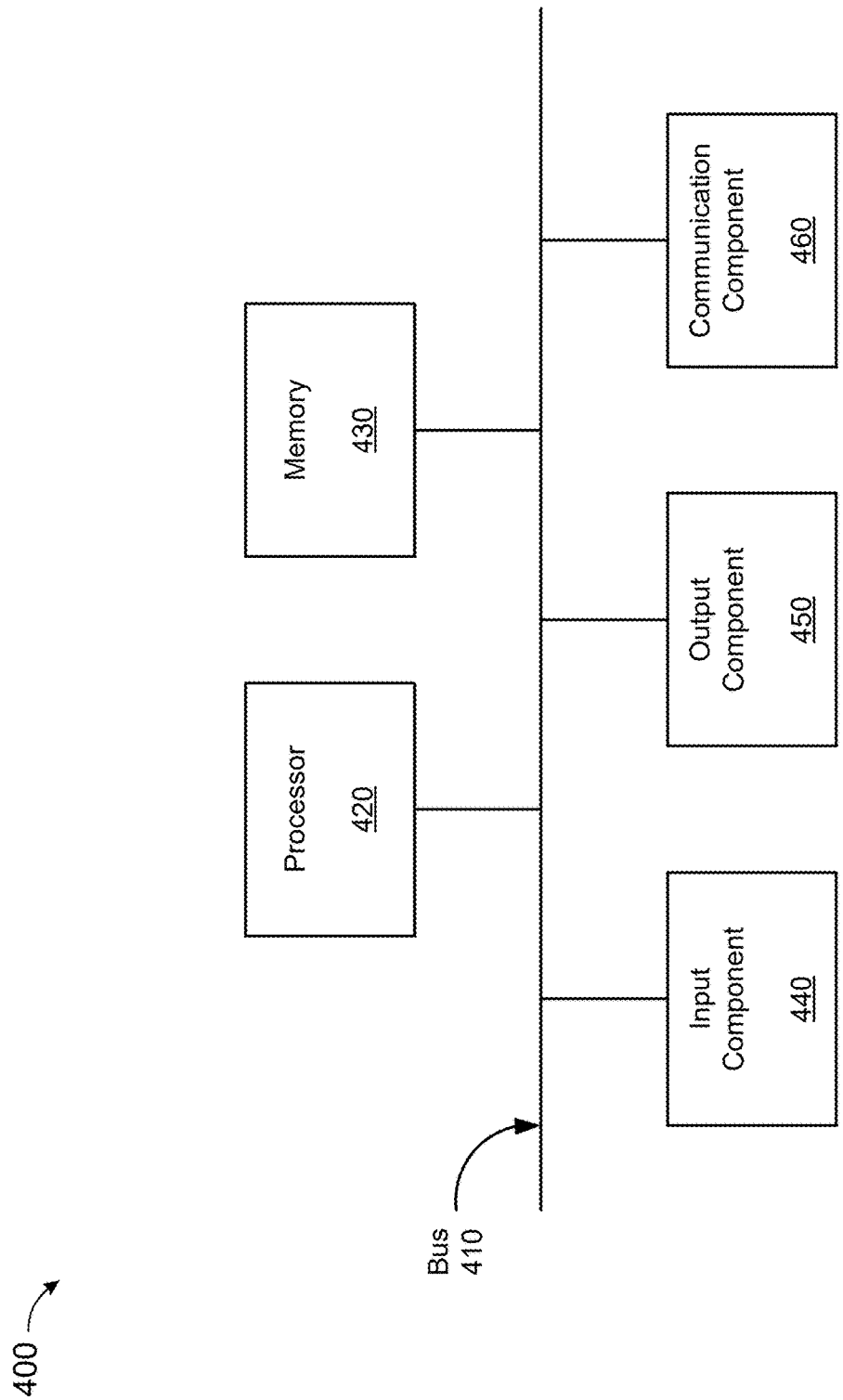
FIG. 4 is a diagram of example components of a device associated with optimized high-speed cylinder pressure data retrieval and reporting.

FIG. 4 is a diagram of example components of a device 400 associated with optimized high-speed cylinder pressure data retrieval and reporting. The device 400 may correspond to the monitoring and reporting module 180, the one or more controllers 210, and/or the plurality of cylinder pressure sensors 230. In some implementations, the monitoring and reporting module 180, the one or more controllers 210, and/or the plurality of cylinder pressure sensors 230 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 associated with optimized high-speed cylinder pressure data retrieval and reporting. One or more process blocks of FIG. 5 may be performed by a monitoring and reporting module (e.g., monitoring and reporting module 180). Additionally, or alternatively, one or more process blocks of FIG. 5 may be performed by another device or a group of devices separate from or including the monitoring and reporting module, such as another device or component that is internal or external to a machine (e.g., the machine 100).

As shown in FIG. 5, process 500 may include receiving, via a first data link of the machine, cylinder pressure data associated with the plurality of cylinders (block 510). For example, the monitoring and reporting module may receive, via a first data link of the machine, cylinder pressure data associated with the plurality of cylinders, as described above.

As further shown in FIG. 5, process 500 may include storing the cylinder pressure data in a data structure (block 520). For example, the monitoring and reporting module may store the cylinder pressure data in a data structure, as described above.

As further shown in FIG. 5, process 500 may include receiving, via a second data link of the machine, operational information associated with the engine (block 530). For example, the monitoring and reporting module may receive, via a second data link of the machine, operational information associated with the engine, as described above. In some implementations, the first data link of the machine is associated with a first data speed, the second data link of the machine is associated with a second data speed, and the first data speed is greater than the second data speed. Further, in some implementations, the first data link is an Ethernet data link, and the second data link is at least one of a CAN data link or an XCP data link.

As further shown in FIG. 5, process 500 may include determining that one or more trigger criteria are satisfied (block 540). For example, the monitoring and reporting module may determine that one or more trigger criteria are satisfied, as described above.

As further shown in FIG. 5, process 500 may include generating a data file that includes a portion of the cylinder pressure data (block 550). For example, the monitoring and reporting module may generate a data file that includes a portion of the cylinder pressure data, as described above.

As further shown in FIG. 5, process 500 may include transmitting the data file to a device not included in the machine (block 560). For example, the monitoring and reporting module may transmit the data file to a device not included in the machine, as described above.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

The above-described techniques allow a monitoring and reporting module (e.g., the monitoring and reporting module 180) of a machine (e.g., the machine 100) to enable optimized cylinder pressure data retrieval and reporting. For example, the monitoring and reporting module receives, via a first data link (e.g., a high speed data link), cylinder pressure data (e.g., high speed cylinder pressure data) associated with a plurality of cylinders (e.g., a plurality of cylinders 220) of an engine (e.g., an engine 160) of the machine and stores the cylinder pressure data in a data structure (e.g., a temporary buffer). The monitoring and reporting module also receives, via a second data link (e.g., a low speed data link), operational information (e.g., low speed operational information) associated with the engine, and thereby determines whether one or more or more trigger criteria are satisfied (e.g., that indicate whether a performance issue with one or more of the cylinders may have occurred). Based on determining that the one or more trigger criteria are satisfied, the monitoring and reporting module generates and transmits a data file (e.g., to another device, not included in the machine, for analysis), wherein the data file includes only a portion of the cylinder pressure data (e.g., a most recent portion of the cylinder pressure data that is associated with an instant in time when the one or more trigger criteria were determined to be satisfied).

In this way, the monitoring and reporting module needs to be configured to store only a partial amount of the cylinder pressure data (e.g., that is associated with a most recent amount of time, which may be measured in seconds) instead of all cylinder pressure data received by the monitoring and reporting module. Further, the monitoring and reporting module transmits a relevant portion of the cylinder pressure data (e.g., for analysis) and therefore does not need to be configured to analyze the cylinder pressure data. Accordingly, specialized equipment (e.g., a high performance computer with high processing and storage capabilities) does not need to be included in, or attached to, the machine. Further, the monitoring and reporting module is able to receive, store, and transmit cylinder pressure data during real-world operation of the machine (e.g., instead of the machine operating in a "testing" or "diagnostic" mode), so the monitoring and reporting module is able to retrieve and report cylinder pressure data related to performance issues of the plurality of cylinders of the engine that would not otherwise be able to be retrieved and reported (e.g., due to inability of a testing or diagnostic mode to cover every potential operating scenario of the machine).

Additionally, because the monitoring and reporting module processes the low speed operational information to determine whether the one or more trigger criteria are satisfied, the monitoring and reporting module can process less data, and at a slower speed, than would be needed to process the high speed cylinder pressure data. Further, because the monitoring and reporting module is not processing the high speed cylinder pressure data to determine whether the one or more trigger criteria are satisfied, the monitoring and reporting module can provide an optimized performance, such as with respect to use of computing resources (e.g., processing resources, memory resources, communication resources, and/or power resources, among other examples) and/or speed and efficiency, related to receiving and storing the cylinder pressure data, and generating and transmitting the data file.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A machine, comprising:
    an engine that includes a plurality of cylinders;
    one or more controllers; and
    a monitoring and reporting module configured to:
        receive, from the one or more controllers, and via a first data link of the machine, cylinder pressure data associated with the plurality of cylinders;
        store the cylinder pressure data in a data structure;
        receive, from the one or more controllers, and via a second data link of the machine, operational information associated with the engine;
        determine, based on the operational information, that one or more trigger criteria are satisfied;
        generate, based on determining that the one or more trigger criteria are satisfied, a data file that includes a portion of the cylinder pressure data stored in the data structure; and
        transmit the data file to a device not included in the machine.

2. The machine of claim 1, wherein:
    the first data link of the machine is associated with a first data speed;
    the second data link of the machine is associated with a second data speed; and
    the first data speed is greater than the second data speed.

3. The machine of claim 1, wherein:
    the first data link is an Ethernet data link; and
    the second data link is at least one of a controller area network (CAN) data link or a universal measurement and calibration protocol (XCP) data link.

4. The machine of claim 1, wherein the machine further comprises a plurality of cylinder pressure sensors that respectively correspond to the plurality of cylinders included in the engine,
    wherein the plurality of cylinder pressure sensors are configured to:
        provide the cylinder pressure data to the one or more controllers of the machine prior to the monitoring and reporting module receiving the cylinder pressure data.

5. The machine of claim 1, wherein the cylinder pressure data includes a first portion of cylinder pressure data associated with a first group of cylinders of the plurality of cylinders and a second portion of cylinder pressure data associated with a second group of cylinders of the plurality of cylinders,
    wherein the monitoring and reporting module, to receive the cylinder pressure data, is configured to:
        receive, from a first controller, of the one or more controllers, and via the first data link, the first portion of cylinder pressure data; and
        receive, from a second controller, of the one or more controllers, and via the first data link, the second portion of cylinder pressure data.

6. The machine of claim 1, wherein the monitoring and reporting module is configured to determine that the one or more trigger criteria are satisfied in association with an instant in time, and wherein:
    the data file includes a first set of cylinder pressure data, of the cylinder pressure data stored in the data structure, associated with a first time period that began prior to, and including, the instant in time; and
    the data file includes a second set of cylinder pressure data, of the cylinder pressure data stored in the data structure, associated with a second time period that ceased after the instant in time.

7. The machine of claim 1, wherein the monitoring and reporting module, to determine that the one or more trigger criteria are satisfied, is configured to at least one of:
    determine, based on the operational information, that a peak pressure associated with a cylinder, of the plurality of cylinders, is greater than a peak pressure threshold;
    determine, based on the operational information, that a detonation level associated with a cylinder, of the plurality of cylinders, is greater than a detonation level threshold;
    determine that the operation information includes a cylinder misfire indicator associated with a cylinder of the plurality of cylinders;
    determine that the operation information includes a cylinder preignition indicator associated with a cylinder of the plurality of cylinders; or
    determine that the operation information includes a sensor error indicator associated with a cylinder of the plurality of cylinders.

8. A monitoring and reporting module of a machine, comprising:
    one or more memories; and
    one or more processors, coupled to the one or more memories, configured to:
        receive, via a first data link of the machine, cylinder pressure data associated with an engine of the machine;
        store the cylinder pressure data in a data structure;
        receive, via a second data link of the machine, operational information associated with the engine of the machine;
        determine, based on the operational information, that one or more trigger criteria are satisfied;
        generate, based on determining that the one or more trigger criteria are satisfied, a data file that includes a portion of the cylinder pressure data stored in the data structure; and
        transmit the data file.

9. The monitoring and reporting module of claim 8, wherein:
    the first data link of the machine is associated with a first data speed;
    the second data link of the machine is associated with a second data speed; and
    the first data speed is greater than the second data speed.

10. The monitoring and reporting module of claim 8, wherein the cylinder pressure data includes a first portion of cylinder pressure data associated with a first group of cylinders of the engine and a second portion of cylinder pressure data associated with a second group of cylinders of the engine, wherein the one or more processors, to receive the cylinder pressure data, are configured to:

receive, from a first controller of the machine, and via the first data link, the first portion of cylinder pressure data; and receive, from a second controller of the machine, and via the first data link, the second portion of cylinder pressure data.

11. The monitoring and reporting module of claim 8, wherein the data structure is a circular buffer.

12. The monitoring and reporting module of claim 8, wherein the one or more processors, to generate the data file, are configured to:

identify an instant in time associated with determining that the one or more trigger criteria are satisfied;

identify a first set of cylinder pressure data, of the cylinder pressure data stored in the data structure, associated with a first time period that began prior to, and including, the instant in time;

identify a second set of cylinder pressure data, of the cylinder pressure data stored in the data structure, associated with a second time period that ceased after the instant in time; and generate the data file to include the first set of cylinder pressure data and the second set of cylinder pressure data.

13. The monitoring and reporting module of claim 8, wherein the one or more processors, to determine that the one or more trigger criteria are satisfied, are configured to:

determine, based on the operational information, that a peak pressure associated with a cylinder of the engine is greater than a peak pressure threshold;

determine, based on the operational information, that a detonation level associated with a cylinder of the engine is greater than a detonation level threshold;

determine that the operation information includes a cylinder misfire indicator associated with a cylinder of the engine;

determine that the operation information includes a cylinder preignition indicator associated with a cylinder of the engine; or determine that the operation information includes a sensor error indicator associated with a cylinder of the engine.

14. The monitoring and reporting module of claim 8, wherein the one or more processors, to transmit the data file, are configured to send the data file via a wireless connection.

15. A method, comprising:

receiving, by a monitoring and reporting module of a machine, via a first data link of the machine, cylinder pressure data associated with an engine of the machine;

receiving, by the monitoring and reporting module, via a second data link of the machine, operational information associated with the engine of the machine;

determining, by the monitoring and reporting module and based on the operational information, that one or more trigger criteria are satisfied;

generating, by the monitoring and reporting module and based on determining that the one or more trigger criteria are satisfied, a data file that includes a portion of the cylinder pressure data; and transmitting, by the monitoring and reporting module, the data file.

16. The method of claim 15, wherein:

the first data link of the machine is associated with a first data speed;

the second data link of the machine is associated with a second data speed; and the first data speed is greater than the second data speed.

17. The method of claim 15, wherein the cylinder pressure data is received, via the first data link, from a plurality of controllers of the machine.

18. The method of claim 15, wherein the monitoring and reporting module determines that the one or more trigger criteria are satisfied in association with an instant in time, and wherein:

the data file includes a first set of cylinder pressure data, of the cylinder pressure data, associated with a first time period that began prior to, and including, the instant in time; and the data file includes a second set of cylinder pressure data, of the cylinder pressure data, associated with a second time period that ceased after the instant in time.

19. The method of claim 15, wherein determining that the one or more trigger criteria are satisfied comprises at least one of:

determining, based on the operational information, that a peak pressure associated with a cylinder of the engine is greater than a peak pressure threshold;

determining, based on the operational information, that a detonation level associated with a cylinder of the engine is greater than a detonation level threshold;

determining that the operation information includes a cylinder misfire indicator associated with a cylinder of the engine;

determining that the operation information includes a cylinder preignition indicator associated with a cylinder of the engine; or determining that the operation information includes a sensor error indicator associated with a cylinder of the engine.

20. The method of claim 15, wherein transmitting the data file includes sending the data file via a wireless connection.

\* \* \* \* \*